3 Sheets—Sheet 1.

E. BECKER.
Self-Acting Brake or Friction-Coupling.

No. 212,584. Patented Feb. 25, 1879.

Witnesses
Chas. H. Smith
Geo. T. Pinckney

Inventor
Eduard Becker
per L. W. Serrell
atty

E. BECKER.
Self-Acting Brake or Friction-Coupling.
No. 212,584. Patented Feb. 25, 1879.

3 Sheets—Sheet 2.

Witnesses
Chas. H. Smith
Geo. T. Pinckney

Inventor
Eduard Becker.
per L. W. Serrell
Atty.

E. BECKER.
Self-Acting Brake or Friction-Coupling.
No. 212,584. Patented Feb. 25, 1879.
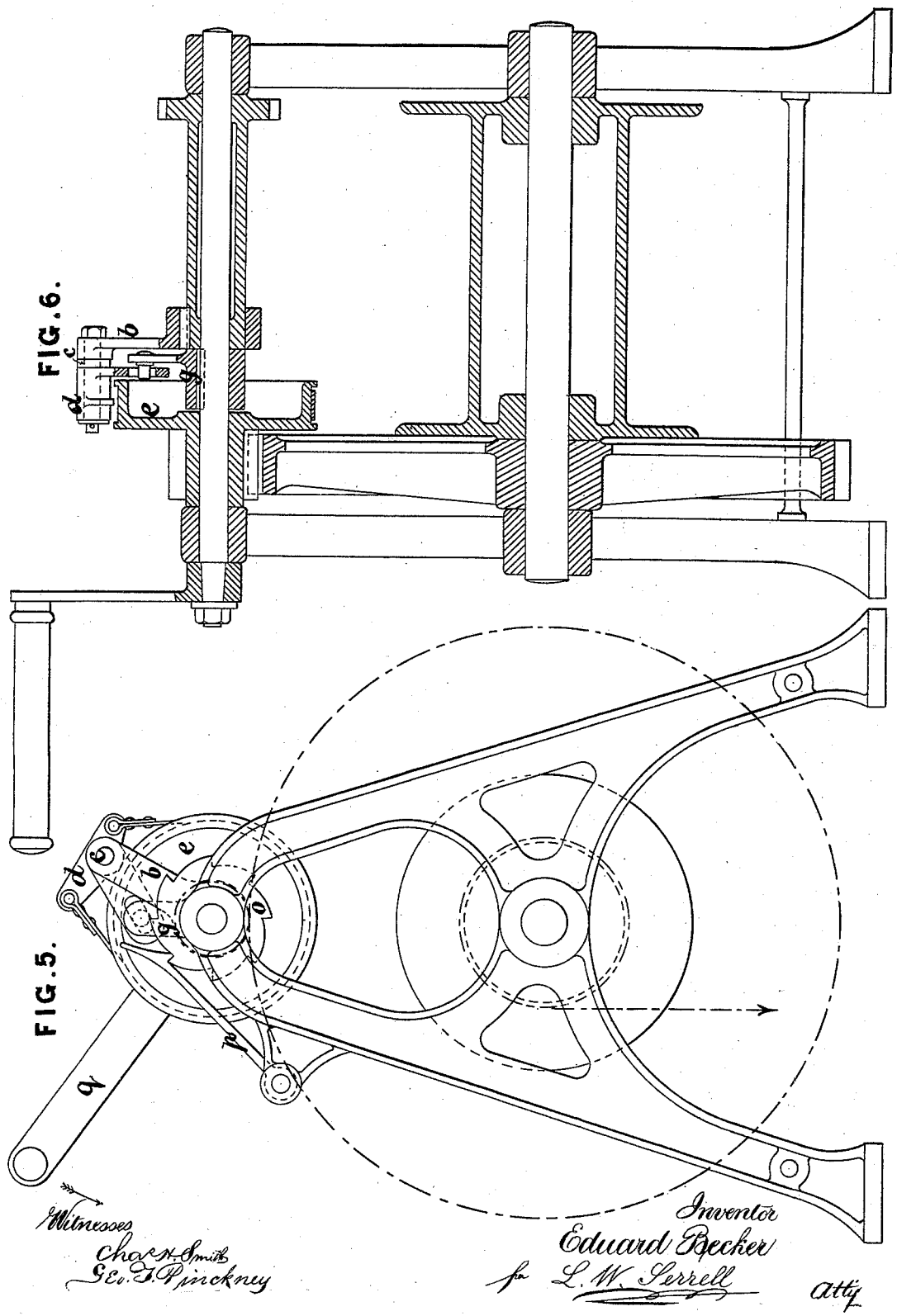

UNITED STATES PATENT OFFICE.

EDUARD BECKER, OF BERLIN, GERMANY.

IMPROVEMENT IN SELF-ACTING BRAKES OR FRICTION-COUPLINGS.

Specification forming part of Letters Patent No. 212,584, dated February 25, 1879; application filed January 6, 1879.

*To all whom it may concern:*

Be it known that I, EDUARD BECKER, of Berlin, Germany, mechanical engineer, have invented new and useful Improvements in Self-Acting Brakes or Friction-Couplings, which improvements are fully set forth in the following specification, reference being had to the accompanying drawings.

The object of this invention is to couple or connect and disconnect without any shock two shafts situated in the same axial line, and one of which is the driving-shaft, and that either during rest or during rotation of the driving-shaft, or of both, by means of a new or improved brake appliance, all as hereinafter described.

Figure 2:
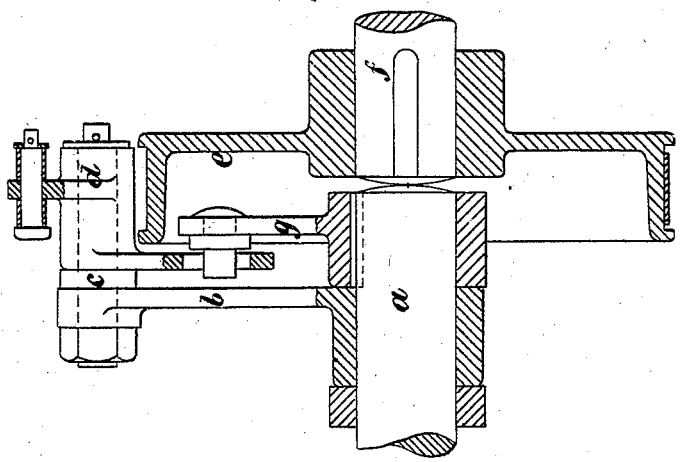
Figure 1:
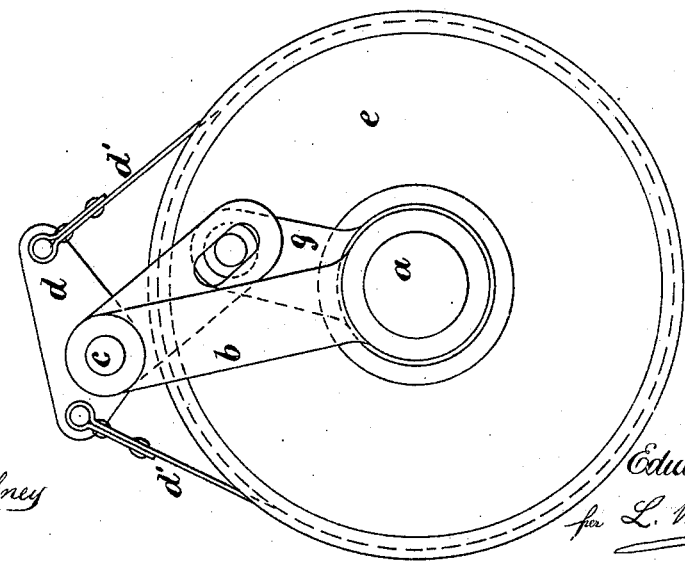

The two shafts may, in general, abut against each other, or one may run partly in a recess in the end of the other, so long as the rotation axis of both be the same. The coupling or connecting is caused thereby. (See Figures 1 and 2.) The driving-shaft $a$ is fitted with a loose lever or crank, $b$, the crank-pin $c$ of which forms the fulcrum for a block or cross-piece, $d$, to which are attached the ends of a brake-band, $d'$, which passes round a brake-drum, $e$, fixed on the driven shaft $f$.

The brake-band $d'$ is tightened by means of a lever or crank, $g$, which is fastened on the driving-shaft $a$, and the crank-pin of which is connected to an arm on the aforesaid block $d$, to which the brake-band $d'$ is attached, so that this block $d$ when turned on its fulcrum tightens the band on the brake-drum $e$.

When the friction between the brake-drum $e$ and the band $d'$ suffices for overcoming the resistance of the driven shaft $f$, this latter is carried round and turns in the same direction and with the same speed as the driving-shaft $a$.

This brake-action and consequent coupling of the two shafts must take place each time, because the crank $b$, which carries the block $d$, with the brake-band $d'$, is loose on the driving-shaft $a$, and is only carried along by the crank $g$, which is fast on the same shaft. The crank-pin of the fixed crank $g$ moves in a slot in the aforesaid arm of the block $d$, thereby allowing both cranks to be relatively changed in position.

The coupling is released either when the driving-shaft $a$ relatively to the driven shaft $f$ obtains a suddenly retarded or slight backward motion, or when the driven shaft $f$, through some other power, obtains a greater speed than it receives from the driving-shaft, or when through a special appliance both cranks are approached to one another.

This coupling may advantageously be applied in a number of special cases—for instance, for two pieces of shafting having the same axis, and of which one is the driving-shaft and the other is to rest at times, or for coupling a driven strap-pulley, or V-pulley or tooth-wheel with its shaft, or, vice versa, for coupling a driven shaft with such a pulley or wheel, or for coupling two machines which have jointly to accomplish a certain work, also with special advantages for working a winch or crane. The coupling also admits of using a shaft with varying speed of rotation.

Figure 4:
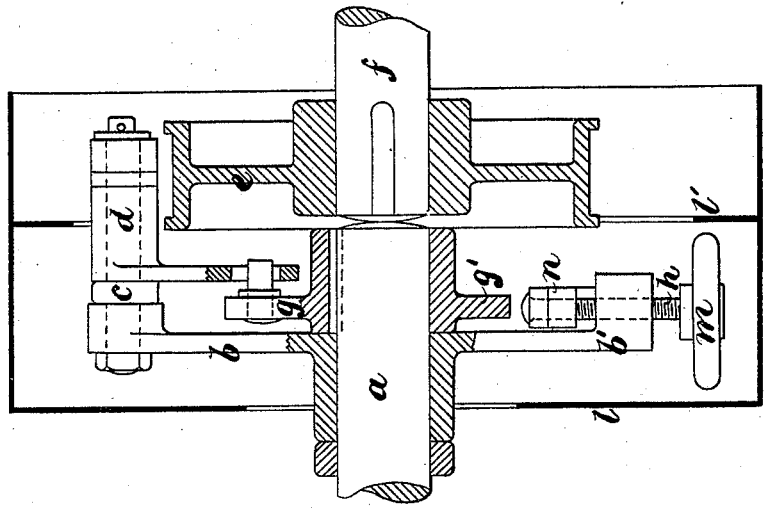
Figure 3:
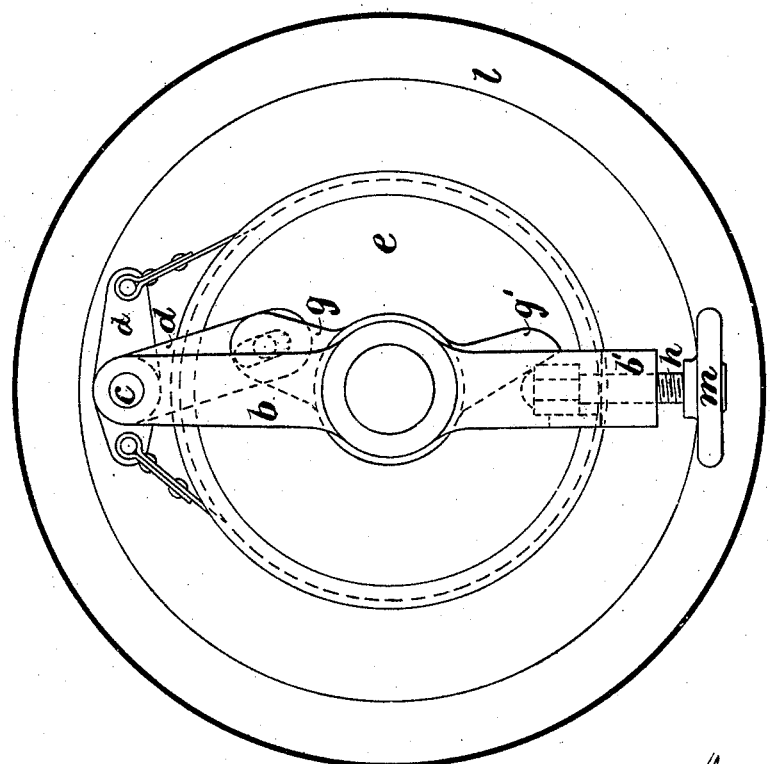

Figs. 3 to 6 illustrate some examples of the application of this coupling. Figs. 3 and 4 represent the coupling of two shafts, of which $a$ is the driving and $f$ the driven shaft, also showing as an example an apparatus for releasing the closed coupling.

The closing of the coupling will be clear from the foregoing and from the drawings.

For releasing the coupling the two cranks $b$ and $g$ are in this instance made to approach to one another. The loose crank, $b$, is prolonged back—that is, formed with an arm, $b'$, on the opposite side of the shaft, and this arm forms the nut for a screw, $h$, which is fitted with a loose wedge-piece, $n$, which can be pushed in between the aforesaid back prolongation $b'$ of the loose crank, $b$, and a back prolongation, $g'$, of the fixed crank, $g$. On the screw is fixed a friction-wheel, $m$, which can be turned in one direction or the other by frictional contact with one of two non-revolving wheels or disks, $l\ l'$, which slide together or separately in the direction of the axis of the shafts, and are placed one on each side of the friction-wheel $m$ on the screw $h$. When this latter has thus, by frictional contact between one of the disks $l$ or $l'$ and the wheel $m$ on the screw $h$, been turned so far and in that direction as that the wedge-piece $n$ touches the said prolongations $b'$ and $g'$, and presses them apart, then the brake is released; and, vice versa, when the screw $h$ is turned in the opposite direction by means of the other stationary disks $l'$ or $l$, then the brake-coupling is closed again. The two stationary disks $l\,l'$ may be hung or guided in prisms or by parallel motion.

As I have thus described an example of coupling and uncoupling of two shafts, so may the same object be carried out with regard to strap-pulleys, V-pulleys, or wheels on their respective shafts, whether the pulleys or wheels are driving or driven.

Figs. 5 and 6 illustrate the invention as applied to winches or cranes or other hoisting or lowering gear.

The coupling may be on a driving or on an intermediate shaft or on the winding-barrel shaft, but in each case it is made to connect and disconnect the shaft on which it is placed with a driving-wheel thereon.

If the coupling is closed, which is caused by turning such shaft in one direction, then the load is being raised.

By providing the loose crank, $b$, with a ratchet-wheel, $o$, and placing therein a firmly-supported pawl, $p$, the load will be supported in place, even if the winch-handle $q$ is let go, because it itself tightens up the brake-band. If a pressure be exerted on the winch-handle $q$ opposite to that required to raise the load, or, in other words, if the winch-handle is turned back, then the loose crank and the fixed crank will approach each other, and the load, more or less braked or retarded, will descend.

This form of brake or coupling has the peculiar advantage that the driving-shaft, with its winch handle or handles, does not revolve during the descent of the load, thus preventing a great danger of accidents to the laborer; also, the advantage that the load is braked into a state of rest when the laborer places the pawl in the ratchet-wheel and leaves the winch-handle.

I thus attain the same advantages as by the Megy-Stauffer winches, but in a different manner.

To illustrate the example of the application of the coupling to give a shaft varying speed of rotation no drawing is needed. Supposing a shaft has several driving-pulleys with different speeds of rotation, and each has such a coupling, then a disconnecting appliance is only needed for the transmission of the greater speed to the shaft, for by the free motion of the two cranks $b$ and $g$ toward each other the quicker-moving driving-pulley will carry the shaft with it, this latter loosening the coupling of the slower-moving driving-pulley.

Instead of the brake-band $d'$ being directly connected to the block $d$, as shown and described, it may be indirectly connected; or, instead of such brake-band, one or more brake blocks or shoes acting against the circumference of a brake-drum may be directly or indirectly connected to or form part of the block $d$.

Figure 7:
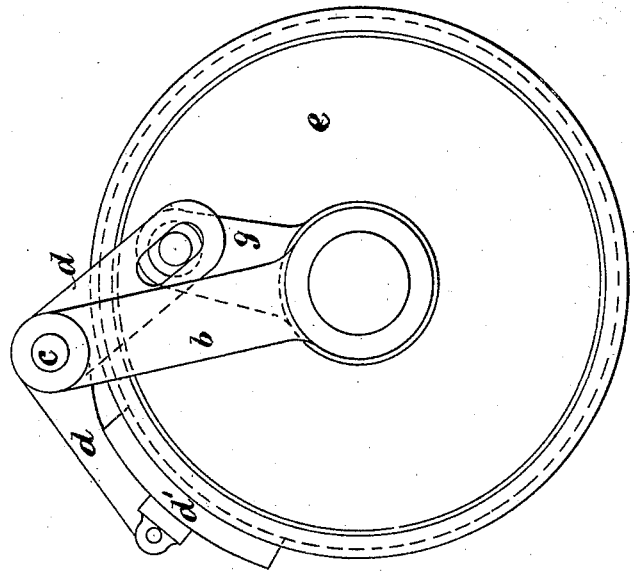

Fig. 7 illustrates such an arrangement, where the block or piece $d$ has jointed to it a brake-block, $d'$, acting as a brake against the drum $e$.

By naming these examples I do not pretend to have exhausted the modes or cases of application of this coupling, but they are given as illustrations only.

I am aware that friction-brakes have been placed between a revolving shaft and a drum that is to be revolved, and that more or less friction has been applied to the brake by a lever under the control of the attendant. In my improvement the brake is self-acting, and serves to prevent injury when the speeds of the driving or driven shafts vary suddenly.

I claim as my invention—

The combination, with the driving and driven shafts, of the crank $g$, attached permanently to the driving-shaft, the drum $e$, attached to the shaft to be driven, the arm $b$, that is loose upon the shaft, the swinging block $d$, pivoted to the arm $b$, and having a slotted arm that is connected to the crank $g$, and the brake block or band acted upon by the swinging block $d$, substantially as set forth.

EDUARD BECKER.

Witnesses:
BERTHOLD ROI,
EDWARD MACLEAN.